United States Patent [19]

Mochida et al.

[11] Patent Number: 4,526,057
[45] Date of Patent: Jul. 2, 1985

[54] RECIPROCATING TYPE PUSH-PULL CABLE ARRANGEMENT FOR TRANSMITTING LONGITUDINAL MOTION

[75] Inventors: Haruo Mochida, Kanagawa; Yoshio Watanuki, Zama, both of Japan

[73] Assignee: Nissan Motor Co., Ltd., Yokohama, Japan

[21] Appl. No.: 507,074

[22] Filed: Jun. 23, 1983

[30] Foreign Application Priority Data

Jul. 20, 1982 [JP] Japan ................. 57-126231

[51] Int. Cl.³ .............................................. F16C 1/10
[52] U.S. Cl. ................. 74/501 R; 74/471 R; 292/8; 292/336.3; 403/287; 403/301
[58] Field of Search .......... 74/501 R, 471 R, 471 XY, 74/501.5 R; 292/8, 28, 38, 50, 336.3; 403/287, 301

[56] References Cited

U.S. PATENT DOCUMENTS

| 1,736,320 | 11/1929 | Melchor | 74/501 |
| 2,480,083 | 8/1949 | McMillan | 74/471 |
| 3,472,096 | 10/1969 | Krause | 74/501 |
| 4,270,403 | 6/1981 | West | 74/501 R |
| 4,374,597 | 2/1983 | Mochida | 292/8 |
| 4,420,988 | 12/1983 | Deligny | 74/501.5 R |

FOREIGN PATENT DOCUMENTS

| 0032378 | 7/1981 | European Pat. Off. | |
| 515799 | 2/1955 | Italy | 74/501 R |
| 264208 | 1/1950 | Switzerland | 74/501 R |
| 2039319 | 8/1980 | United Kingdom | |
| 1582435 | 1/1981 | United Kingdom | |
| 2061443 | 5/1981 | United Kingdom | 74/501 R |

Primary Examiner—Kenneth J. Dorner
Assistant Examiner—Vinh Luong
Attorney, Agent, or Firm—Schwartz, Jeffery, Schwaab, Mack, Blumenthal & Evans

[57] ABSTRACT

A push-pull cable arrangement for selectively transmitting longitudinal motion to two separate destinations has an inner wire having a front end, a rear end and an intermediate node between the front and rear ends. The inner wire is enclosed with a first outer casing between the front end and the intermediate node, and with a second outer casing between the intermediate node and the rear end. A front end of the first casing facing the front end of the wire is stationary, and a rear end of the second casing facing the rear end of the inner wire is also stationary. There is further provided an intermediate unit having a first member to which a rear end of the first casing is fixed, and a second member to which a front end of the second casing is fixed. One of the first and second members is a stationary housing, and the other is a sliding member slidably contained in the housing. The housing and the sliding member receives the inner wire with the intermediate node slidably, and the sliding member is movable longitudinally of the wire in the housing. When the inner wire is pulled, the sliding member abuts against the housing and can not move, so that a pull motion is transmitted to the rear end of the wire. When the wire is pushed, the intermediate node causes the sliding member to move away from the housing, and this movement is transmitted to another destination.

4 Claims, 7 Drawing Figures

RECIPROCATING TYPE PUSH-PULL CABLE ARRANGEMENT FOR TRANSMITTING LONGITUDINAL MOTION

BACKGROUND OF THE INVENTION

The present invention relates to a so-called push-pull cable arrangement for selectively transmitting longitudinal motion to two separate destinations by pushing and pulling an inner wire enclosed in outer casings.

Such a push-pull cable arrangement of one type is disclosed in Japanese patent application No. 55-1621 or U.S. Pat. No. 4,374,597. In this push-pull cable arrangement, the inner wire has a front end, a rear end and an intermediate node between the front and rear ends. A first outer casing having a front end and a rear end encloses the inner wire between the front end and the intermediate node of the inner wire. A second outer casing having a front end and a rear end encloses the inner wire between the intermediate node and the rear end of the wire. The front end of the inner wire is connected with a hand lever for pushing and pulling the inner wire. The rear end of the inner wire is connected with a first receiving unit to be moved by the inner wire. The front end of the first outer casing is held stationary, and the rear end of the first outer casing is movable. The front and rear ends of the second outer casing are both held stationary. When the inner wire is pulled, the intermediate node of the inner wire is free to move longitudinally in such a pull direction, and the longitudinal motion of the inner wire in the pull direction is transmitted to the first receiving unit. When the inner wire is pushed, the intermediate node is prevented from moving in such a push direction by a stationary stopper, so that the longitudinal motion of the inner wire in the push direction is not transmitted to the first receiving unit. Instead, the rear end of the first outer casing moves away from the intermediate node toward the front end of the inner wire. One end of a swingable lever is connected with the rear end of the first outer casing so that the lever swings by the movement of the rear end of the first outer casing. The lever is connected with a second receiving unit by a link. Thus, the movement of the rear end of the first outer casing, when the inner wire is pushed, is transmitted to the second receiving unit.

However, the swingable lever of this push-pull cable arrangement is very obstructive especially when the push-pull cable arrangement is installed in a narrow space in which other wires and cables are stretched. The swingable lever is liable to interfere with other wires and cables lying nearby. There is a possibility that the movement of the swingable lever is hampered by other wires, and other wires are cut by the swingable lever. Besides, the swingable lever is undesirable because the swingable lever causes an increase of the size of the arrangement.

SUMMARY OF THE INVENTION

It is an object of the invention to provide a push-pull cable arrangement having a new construction.

It is another object of the present invention to provide a push-pull cable arrangement which is small in size, and less obstructive when confined in a narrow space together with other wires and parts.

According to the present invention, the push-pull cable arrangement for transmitting longitudinal motion comprises a wire, a first casing, a second casing, an input unit, an intermediate unit, link means, a first receiving unit and a second receiving unit. The wire has a front end, a rear end and an intermediate node between the front and rear ends. The first casing encloses the wire between the front end and the intermediate node, and has a front end and a rear end. The second casing encloses the wire between the intermediate node and the rear end, and has a front end and a rear end. The input unit has a stationary member to which the front end of the first casing is fixed, and a movable member connected with the front end of the wire and capable of pulling the wire from the first casing and pushing the wire into the first casing. The intermediate unit has a first member to which the rear end of the first casing is fixed, and a second member to which the front end of the second casing is fixed. The first and second members has a closest position in which the first and second members abut against each other so as to prevent the distance between the rear end of the first casing and the front end of the second casing from becoming lower than a predetermined minimum distance. The first and second members receive the wire slidably, and allow the intermediate node of the wire to move longitudinally between the rear end of the first casing and the front end of the second casing even when the first and second members are in the closest position. The first and second members are movable relatively away from each other rectilinearly so as to increase the distance between the rear end of the first casing and the front end of the second casing beyond the minimum distance. The intermediate node is capable of pushing the second member when the intermediate node is closest to the front end of the second casing. The link means has a link member having a front end and a rear end. The front end of the link member is connected with the intermediate unit and caused to move longitudinally by the relative motion between the first and second members of the intermediate unit. The first receiving unit has a first member connected with the rear end of the wire, and a second member connected with the rear end of the second casing. The second receiving unit has a movable member connected with the rear end of the linke member and caused to move by the link member.

In one embodiment of the present invention, the second member of the intermediate unit is a stationary housing having a hole which extends longitudinally of the wire and has a bottom. The first member of the intermediate unit is a sliding member slidably contained in the hole of the housing. The sliding member has a hole which extends longitudinally of the wire, contains the intermediate node longitudinally movably and opens toward the bottom of the hole of the housing. The sliding member abuts against the bottom of the hole of the housing when the sliding member and the housing are in the closest position. The hole of the sliding member allows the intermediate node to project from the hole of the sliding member and to move away from the rear end of the first casing. The bottom of the hole of the housing limits the longitudinal movement of the intermediate node toward the front end of the second casing.

In another embodiment of the present invention, the first member of the intermediate unit is a stationary housing having a hole which extends longitudinally of the wire and has a bottom. The second member of the intermediate unit is a sliding member slidably contained in the hole of the housing. The sliding member has a hole which extends longitudinally of the wire, contains the intermediate node longitudinally movably, opens toward the bottom of the hole of the housing, and has a bottom. The sliding member abuts against the bottom of the housing when the sliding member and the housing are in the closest position. The intermediate node is capable of pushing the bottom of the hole of the sliding member so as to push the sliding member away from the rear end of the first casing.

DETAILED DESCRIPTION OF THE INVENTION

FIGS. 1 to 5 show one embodiment of the present invention.

Figure 1:
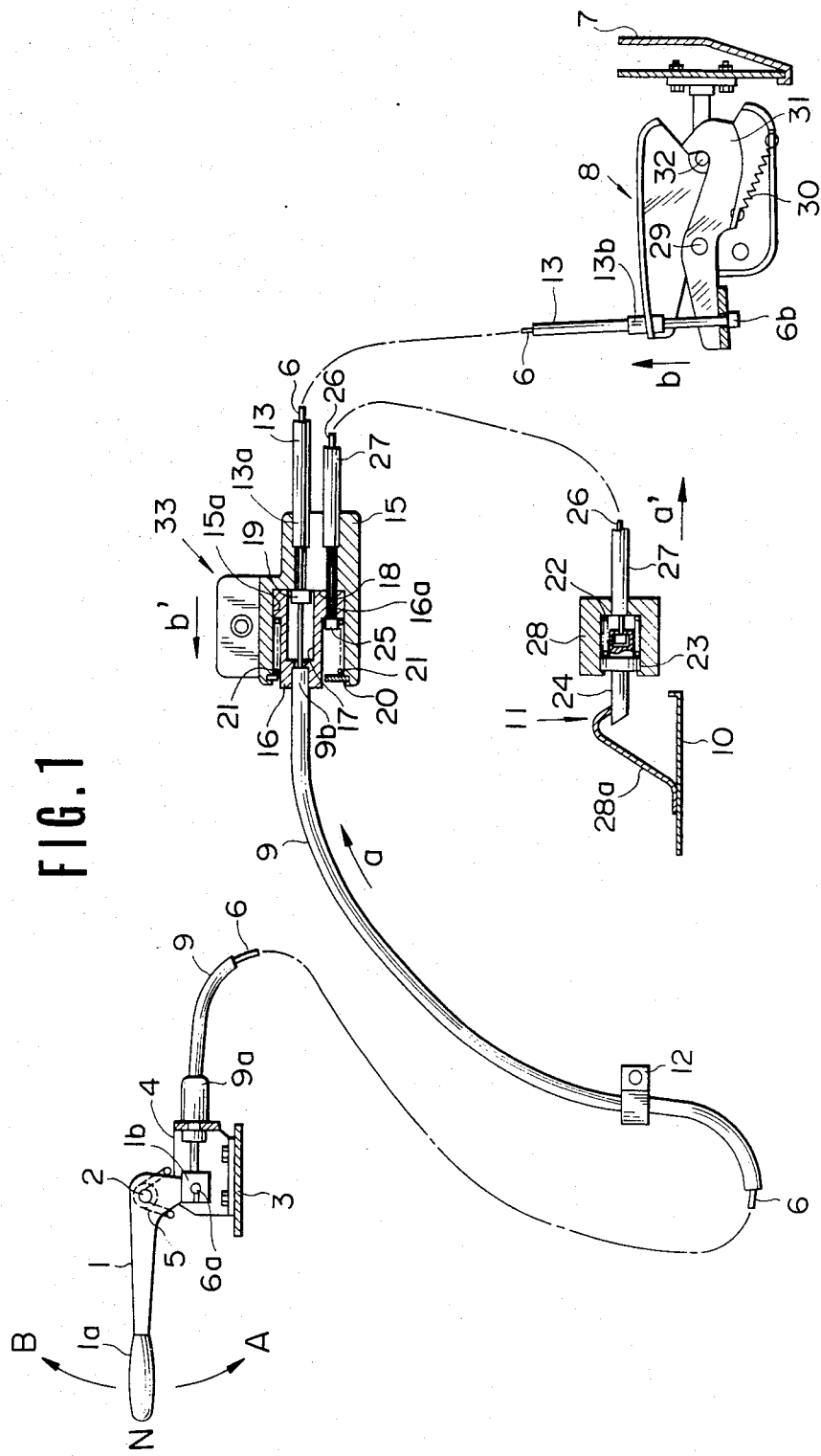
FIG. 1 is a view partly in section showing one embodiment of the push-pull cable arrangement according to the present invention.

In FIG. 1, a hand lever 1 of a L shape has a first arm 1a and a second arm 1b, and is pivoted at a central corner on a pin 2, which is supported by a bracket 4 fastened to a vehicle body 3 near a driver's seat. Thus, the hand lever 1 can swing on the pin 2 in two opposite directions from a neutral position N shown in FIG. 1. The hand lever 1 is biased by a return spring 5 toward the neutral position.

An inner wire 6 has a first end 6a to which a bead is fixed by staking or calking or other method, a second end 6b to which a bead is fixed similarly, and an intermediate node 19 which lies between the first end 6a and the second end 6b and to which a bead is fixed similarly. The first end 6a of the inner wire 6 is connected with second arm 1b of the hand lever 1 so that the inner wire 6 can be pushed and pulled by the hand lever 1. The inner wire extends from the hand lever 1 toward the rear of the vehicle, and the second end 6b is engaged with a first receiving unit which is a lock mechanism 8 of a trunk lid 7 of the vehicle in this embodiment. In some type of vehicle, the first receiving unit may be a lock mechanism for a back door.

A flexible first outer casing 9 encloses the inner wire 6 between the first end 6a and the intermediate node 19 in such a manner that the inner wire 6 is slidable longitudinally in the first outer casing 9. The first outer casing 9 is supported slidably by a clamp 12 on the vehicle body. A first end 9a of the first outer casing is fixed to the bracket 4, so that the first end 9a is stationary. A second end 9b of the first outer casing 9 is movable, and is connected, through an intermediate unit 33, with a second receiving unit which is a lock mechanism 11 of a fuel filler lid 10 of the vehicle in this embodiment.

The intermediate unit 33 has a housing 15 having a hole 15a, and a sliding member 16 which is slidably received in the hole 15a. The housing 15 is fixed to a bracket 14 which in turn fixed to the vehicle body by bolts or other fastening means. The second end 9b of the first outer casing 9 is fixed to the sliding member 16, so that the second end 9b and the sliding member 16 are longitudinally movable together. The sliding member 16 has a hook portion 16a. A second wire 26 is extended between the intermediate unit 33 and the lock mechanism 11 of the fuel filler lid 10. A bead is fixed to a first end 25 of the second wire 26, and this bead is engaged with the hook portion 16a of the sliding member 16. A second end of the second wire 26 is engaged with the lock mechanism 11 of the fuel filler lid 10. The sliding member 16 abuts against a bottom 18 of the hole 15a formed in the housing 15 when the hand lever 1 is in the neutral position. The sliding member 16 is formed with a hole 17 having a diameter greater than the diameter of the inner wire 6. The hole 17 of the sliding member 16 receives the intermediate node 19 of the inner wire 6 slidably. The intermediate node 19 abuts against the bottom 18 of the hole 15a formed in the housing 15 when the hand lever 1 is in the neutral position. A spring 21 is disposed under compression between a washer 20 fixed to the housing 15 and the sliding member 16. The spring 21 is biasing the sliding member 16 toward the bottom 18 of the hole 15a. The second wire 26 is enclosed with a third outer casing 27 in such a manner that the second wire 26 is slidable relative to the third outer casing 27. A first end of the third outer casing 27 is fixed to the housing 15 of the intermediate unit 33.

The lock mechanism 11 of the fuel filler lid 10 has a housing 28 fixed to the vehicle body, and a locking rod 24. The locking rod 24 is slidable in the housing 28, and biased by a spring 22 toward a lock position. The movement of the locking rod 24 is limited by a stopper portion 23. A first end of the locking rod 24 is engaged with a second end of the second wire 26. A second end of the locking rod 24 is engaged with a hook 28a of the fuel filler lid 10. A second end of the third outer casing 27 is fixed to the housing 28.

Figure 3:
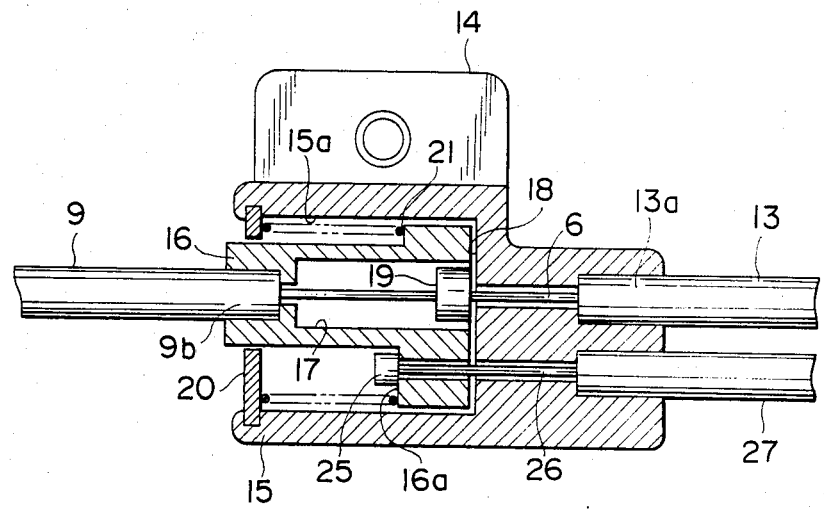
FIG. 3 is a sectional view of the portion of FIG. 2.

A second outer casing 13 encloses the inner wire 6 between the intermediate node 19 and the second end 6b in such a manner that the inner wire 6 is slidable relative to the second outer casing 13. A first end 13a of the second outer casing 13 is fixed to the housing 15 of the intermediate unit 33, as shown in FIG. 3. A second end 13b of the second outer casing 13 is fixed to the lock mechanism 8 of the trunk lid 7.

The lock mechanism 8 of the trunk lid 7 has a latch lever 31 which is pivotally supported, in the middle, by a pin 29, and biased by a spring 30 toward a lock position. The inner wire 6 passes through one end of the latch lever 31, and the second end 6b of the inner wire 6 abuts against the end of the latch lever 31. The other end of the latch lever 31 is engaged with a striker 32 which is integral with the trunk lid 7.

The thus constructed push-pull cable arrangement is operated as follows:

When the hand lever 1 is turned in a direction A shown in FIG. 1 from the neutral position N, the inner wire 6 moves longitudinally in a push direction shown by an arrow a in FIG. 1. However, the intermediate node 19 abuts against the bottom 18 of the hole 15a formed in the housing 15 as shown in FIG. 3, and by so doing, prevents the longitudinal motion of the inner wire 6 between the intermediate node 19 and the second end 6b. Accordingly, the longitudinal motion in the push direction is not transmitted to the lock mechanism 8 of the trunk lid 7. The rotational movement of the hand lever 1 in the direction A pushes the first end 6a of the inner wire 6, and increases the length of the inner wire between the first end 9a of the first outer casing 9 and the first end 13a of the second outer casing 13.

Figure 5:
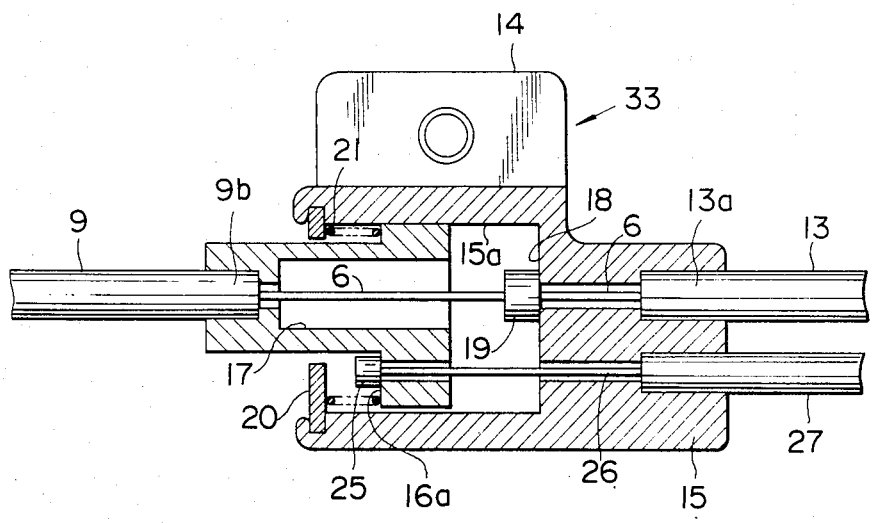

Consequently, the second end 9b of the first outer casing 9 is pulled longitudinally toward the first end 9a. As shown in FIG. 5, this movement of the second end 9b of the first outer casing 9 causes the sliding member 16 to move leftwards in the hole 15a against the force of the spring 21, and to pull the first end 25 of the second wire 26. Thus, the second wire 26 is pulled, and in turn causes the locking rod 24 to move in a direction shown by an arrow a' in FIG. 1 and to release the hook 28a of the fuel filler lid 10. The fuel filler lid 10 opens by the aid of a spring mechanism or a cylinder mechanism. In this case, the second wire 26 is pulled through a distance equal to the distance traveled by the second end 9b of the first outer casing 9, so that the locking rod 24 can be moved through an enough distance. In this push operation, the portion of the inner wire 6 between the intermediate node 19 and the second end 6b does not move relative to the second outer casing 13, and the second end 6b does not move either, so that the lock mechanism 8 of the trunk lid 7 is not moved.

When the hand lever 1 is turned back to the neutral position from the position for pushing the inner wire 6, the second end 9b of the first outer casing 9 moves rightwards. Accordingly, the sliding member 16 moves rightwards with the aid of the biasing force of the spring 21 until the sliding member 16 comes in contact with bottom 18 of the hole 15a of the housing 15 again.

Figure 4:
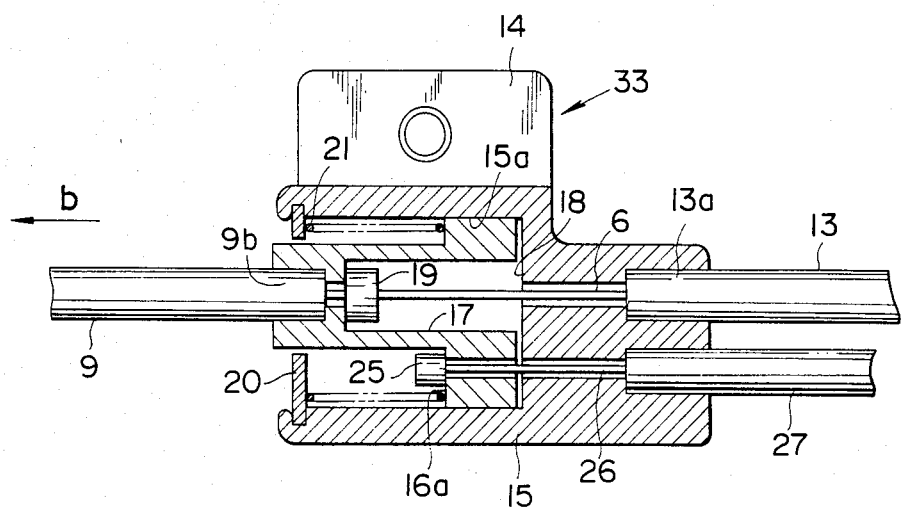
FIGS. 4 and 5 are sectional views showing the portion of FIG. 3 in various operating conditions.

When the hand lever 1 is turned from the neutral position in a direction B shown in FIG. 1, the inner wire 6 is pulled in a pull direction shown by an arrow b in FIG. 4. Accordingly, the second end 6b of the inner wire 6 causes the latch lever 31 to rotate against the spring 30, release the striker 32 from the latch lever 31 and unlocks the trunk lid 7. Thus, the trunk lid 7 opens with the aid of an unshown spring mechanism (the reaction force of a weather strip). In this pull operation, the intermediate node 19 moves in a direction shown by an arrow b' in FIG. 1 in the hole 17 of the sliding member 16. It is preferable to make the hole 17 so deep that the intermediate node 19 does not abut on the bottom of the hole 17 of the sliding member 16 as long as the hand lever 1 is within a range within which the hand lever 1 is allowed to turn in the direction B.

Figure 2:
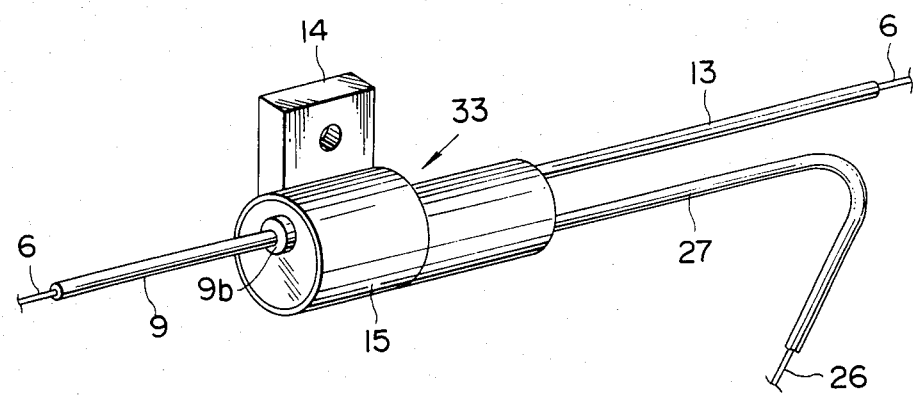
FIG. 2 is a perspective view showing a portion of the push-pull cable arrangement of FIG. 1.

In the intermediate unit 33 according to the present invention, the sliding member 16 which moves in a reciprocating manner is enclosed in the housing 15, so that the size of the intermediate unit 33 can be reduced as shown in FIG. 2. Besides, moving parts of the intermediate unit 33 can be easily covered by the housing 15. Even if the sliding member 16 projects out of the housing 15, the sliding member 16 is not obstructive because the motion of the sliding member 16 is a longitudinal reciprocating motion. Therefore, other wires and cables can be disposed near the intermediate unit 33 without fear of interference between them and the intermediate unit 33.

Figure 6:
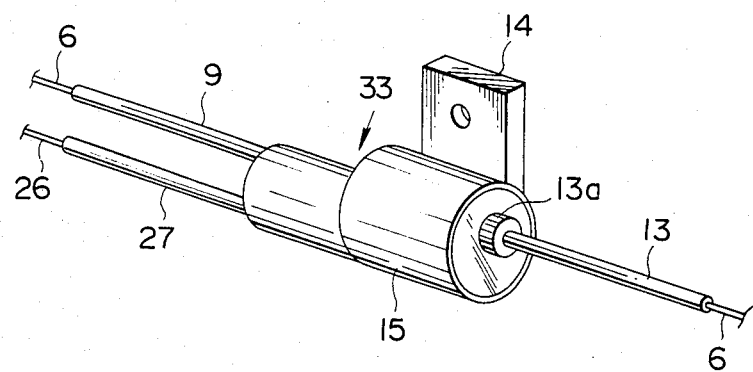
FIG. 6 is a perspective view showing a portion of another embodiment of the present invention.
Figure 7:
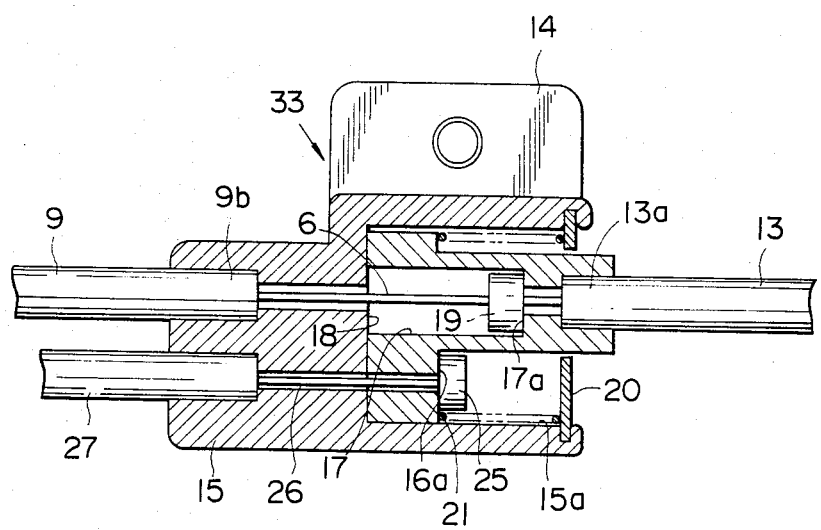
FIG. 7 is a sectional view of the portion of FIG. 6.

Another embodiment of the present invention is shown in FIGS. 6 and 7. This embodiment is different from the preceding embodiment only in the intermediate unit 33. In this embodiment, the second end 9b of the first outer casing 9 is fixed to the stationary housing 15 of the intermediate unit 33, and the first end 13a of the second outer casing 13 is movable and is fixed to the sliding member 16 of the intermediate unit 33. The sliding member 16 is formed with a hole 17 which receives the intermediate node 19 of the inner wire 6 slidably. A bottom 17a of the hole 17 limits the movement of intermediate node 19. When the hand lever 1 is in the neutral position N shown in FIG. 1, the sliding member 16 abuts on the bottom 18 of the hole 15a which receives the sliding member 16, as shown in FIG. 7. The first end 25 of the second wire 26 is positioned on the second outer casing side of the hook portion 16a of the sliding member 16, and is engaged with the hook portion 16a.

When the inner wire 6 is moved longitudinally in the push direction by turning the hand lever 1, the inner wire 6 can not bend within the first outer casing 9, that is, the inner wire 6 is always kept in parallel with the first outer casing 9, and accordingly, the intermediate node 19 pushes the bottom 17a of the hole 17 of the sliding member 16. This causes the sliding member 16, the first end 13a of the second outer casing 13 and the first end 25 of the second wire 26 to move together rightwards in FIG. 8. Thus, the second wire 26 is pulled, and the lock 11 of the fuel filler lid 10 is unlocked.

When the inner wire 16 is pulled by the hand lever 1, the second end 6b of the inner wire 6 rotates the latch lever 31 and releases the striker 32 from the latch lever 31, so that the trunk lid 7 is unlocked. In place of the second wire 26 and the third outer casing 27, a rigid link can be used for transmitting motion from the intermediate unit 33 to the lock mechanism 11 of the fuel filler lid 10, in this and preceding embodiments.

What is claimed is:
1. A push-pull cable arrangement for transmitting longitudinal motion, comprising:
a wire having a front end, a rear end and an intermediate node between the front end and the rear end,
a first casing enclosing the wire between the front end and the intermediate node, and having a front end and a rear end,
a second casing enclosing the wire between the intermediate node and the rear end, and having a front end and a rear end,
an input unit having a stationary member to which the front end of the first casing is fixed, and a movable member connected with the front end of the wire and capable of pulling the wire from the first casing and pushing the wire into the first casing,
an intermediate unit having a first member to which the rear end of the first casing is fixed, and a second member to which the front end of the second casing is fixed, the first member and the second member having a closest position in which the first member and the second member abut against each other so as to prevent the distance between the rear end of the first casing and the front end of the second casing from becoming lower than a predetermined minimum distance, the first member and the second member receiving the wire slidably and allowing the intermediate node of the wire to move longitudinally between the rear end of the first casing and the front end of the second casing even when the first and second members are in the closest position, the first and second members being relatively movable away from each other rectilinearly so as to increase the distance between the rear end of the first casing and the front end of the second casing beyond the minimum distance, the intermediate node being capable of pushing the second member when the intermediate node is closest to the front end of the second casing,
link means comprising a link member having a front end and a rear end, the front end of the link mem- ber being connected with the intermediate unit and caused to move longitudinally by the relative movement between the first and second members of the intermediate unit, a first receiving unit having a first member connected with the rear end of the wire and a second member connected with the rear end of the second casing, and a second receiving unit having a movable member connected with the rear end of the link member and caused to move by the link member, wherein the second member of the intermediate unit is a stationary housing having a hole which extends longitudinally of the wire and has a bottom, and the first member of the intermediate unit is a sliding member slidably contained in the hole of the housing, the sliding member having a hole which extends longitudinally of the wire, contains the intermediate node longitudinally movably and opens toward the bottom of the hole of the housing, the sliding member abutting against the bottom of the hole of the housing when the sliding member and the housing are in the closest position, the hole of the sliding member allowing the intermediate node to project from the hole of the sliding member and to move away from the rear end of the first casing, the bottom of the hole of the housing limiting the longitudinal movement of the intermediate node toward the front end of the second casing.

2. The push-pull cable arrangement according to claim 1, wherein the link member of the link means is a second wire, the link means further comprising a third casing enclosing the second wire and having a front end and a rear end, the front end of the second wire being connected to the sliding member of the intermediate unit, and the front end of the third casing being fixed to the housing of the intermediate unit so that the front end of the second wire can be pulled from the third casing when the sliding member moves away from the housing.

3. The push-pull cable arrangement according to claim 2, wherein the intermediate unit further has a spring for biasing the sliding member toward the closest position.

4. A push-pull cable arrangement for transmitting longitudinal motion, comprising:

a wire having a front end, a rear end and an intermediate node between the front end and the rear end, a first casing enclosing the wire between the front end and the intermediate node, and having a front end and a rear end, a second casing enclosing the wire between the intermediate node and the rear end, and having a front end and a rear end, an input unit having a stationary member to which the front end of the first casing is fixed, and a movable member connected with the front end of the wire and capable of pulling the wire from the first casing and pushing the wire into the first casing, an intermediate unit having a first member to which the rear end of the first casing is fixed, and a second member to which the front end of the second casing is fixed, the first member and the second member having a closest position in which the first member and the second member abut against each other so as to prevent the distance between the rear end of the first casing and the front end of the second casing from becoming lower than a predetermined minimum distance, the first member and the second member receiving the wire slidably and allowing the intermediate node of the wire to move longitudinally between the rear end of the first casing and the front end of the second casing even when the first and second members are in the closest position, the first and second members being relatively movable away from each other rectilinearly so as to increase the distance between the rear end of the first casing and the front end of the second casing beyond the minimum distance, the intermediate node being capable of pushing the second member when the intermediate node is closest to the front end of the second casing, link means comprising a link member having a front end and a rear end, the front end of the link member being connected with the intermediate unit and caused to move longitudinally by the relative movement between the first and second members of the intermediate unit, a first receiving unit having a first member connected with the rear end of the wire and a second member connected with the rear end of the second casing, and a second receiving unit having a movable member connected with the rear end of the link member and caused to move by the link member, wherein the first member of the intermediate unit is a stationary housing having a hole which extends longitudinally of the wire and has a bottom, and the second member of the intermediate unit is a sliding member slidably contained in the hole of the housing, the sliding member having a hole which extends longitudinally of the wire, contains the intermediate node longitudinally movably, opens toward the bottom of the hole of the housing and has a bottom, the sliding member abutting against the bottom of the hole of the housing when the sliding member and the housing are in the closest position, the intermediate node being capable of pushing the bottom of the hole of the sliding member so as to move the sliding member away from the rear end of the first casing.

* * * * *